United States Patent [19]

Herwig

[11] 4,441,513
[45] Apr. 10, 1984

[54] TAILINGS MONITOR FOR COMBINE HARVESTER

[75] Inventor: Warren E. Herwig, Wind Lake, Wis.

[73] Assignee: Allis-Chalmers Corp., Milwaukee, Wis.

[21] Appl. No.: 403,785

[22] Filed: Jul. 30, 1982

[51] Int. Cl.$^3$ .................... A01F 12/00; G01N 21/85
[52] U.S. Cl. ............................ 130/27 B; 130/27 R; 56/10.2; 250/223 R; 250/577; 356/436
[58] Field of Search ............... 56/10.2, 14.6, DIG. 15; 130/24, 26, 27 R, DIG. 4, DIG. 6, 27 B; 209/1; 356/436; 250/577, 223 R

[56] References Cited

U.S. PATENT DOCUMENTS

| | | | |
|---|---|---|---|
| 3,202,154 | 8/1965 | Viebrock | 130/24 |
| 3,515,144 | 6/1970 | Morrison | 56/10.2 |
| 3,563,013 | 2/1971 | Elfes | 56/10.2 |
| 3,606,745 | 9/1971 | Girodat | 209/1 |
| 3,827,810 | 8/1974 | Codina | 356/436 |
| 3,939,846 | 2/1976 | Drozhzhin et al. | 56/10.2 |
| 4,348,855 | 9/1982 | DePauw et al. | 56/10.2 |

*Primary Examiner*—Robert Peshock
*Assistant Examiner*—John G. Weiss
*Attorney, Agent, or Firm*—Lee H. Kaiser

[57] ABSTRACT

A combine harvester vehicle having threshing, separating and cleaning stages for cut crop material and a tailings return elevator for conveying tailings to one of the stages for recycling, is provided with a tailings monitor including a photodiode for transmitting a radiant energy beam across the path of tailings being conveyed in the elevator, an electrical circuit including a photodetector for deriving digital signals indicative of whether the beam is impinging on the photodetector or is being interrupted by the tailings, and an RC circuit which charges a capacitor through a resistance when the digital signal is present indicating that the beam is interrupted and discharges it when the opposite digital signal is present to thereby develop an average voltage across the capacitor which is an analog of the percentage of time that the beam is interrupted by the tailings being conveyed in the elevator and can be visually displayed on a voltmeter to the combine operator as a measure of tailings volume. In an alternative embodiment the digital signals are coupled to a microprocessor for processing of the signals and display to the operator.

9 Claims, 5 Drawing Figures

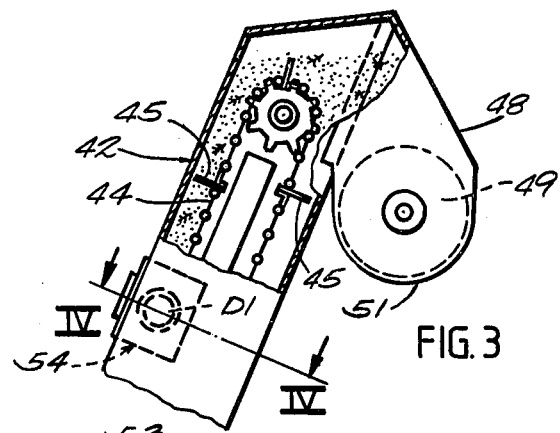
FIG. 3
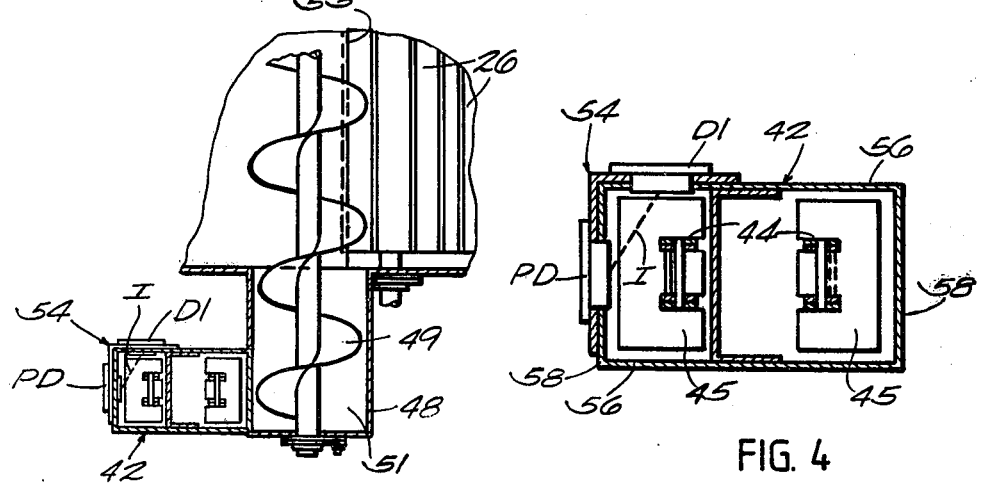
FIG. 2
FIG. 4

TAILINGS MONITOR FOR COMBINE HARVESTER

This invention relates to agricultural combines and in particular to means for monitoring the efficiency of a harvesting process being carried out by the combine.

BACKGROUND OF THE INVENTION

As an agricultural combine is propelled through a field, it cuts the standing crop and feeds the cut crop to a threshing cylinder which beats the crop material to initially separate most of the grain from the straw which is discharged out of the rear of the combine. The separated grain containing chaff and other foreign material is usually fed to a cleaning shoe which conventionally includes a plurality of vertically spaced oscillatory sieves that separate the grain from the chaff and feed the clean grain forward while a stream of chaffer air is directed rearwardly through the sieves and blows the chaff and lighter foreign material out of the rear of the combine. The grain falling through the front end of the sieves is collected and moved up a clean grain elevator to a storage area, while the material falling through the rear end of the cleaning shoe is a fluffy mixture of grain and mature vegetation on which it grows, such mixture being termed "tailings" which are usually collected and delivered by a tailings elevator to be rethreshed. In the case of wheat, barley and similar crops, tailings include the grain which remains attached to the fragments of the heads, while in the case of corn, tailings include kernels which remain attached to pieces of the cob.

The volume of tailings being recycled depends upon the efficiency of the threshing cylinder and the cleaning shoe, and such efficiency is determined by such factors as clearance between the threshing cylinder and the concave, the speed of the threshing cylinder, the sieve opening, the volume of chaffer air, and the rate at which crop is fed into the combine—the last factor depending upon speed of the combine and is easily adjusted by the combine operator. Windows in the tailings return are known to permit the combine operator to observe the volume of tailings. If the tailings are not sufficiently dry, the combine operator may desire to delay threshing for several days. If volume of tailings is excessive, the combine operator may decide that the threshing mechanism and cleaning shoe are excessively loaded so that combine speed should be reduced, and thus the rate at which the crop is fed into the combine. Alternatively he may increase the sieve opening or the chaffer air for the purpose of reducing the volume of tailings. However, access from the operator's station to such window in the tailings return presents a problem, and even if such access is possible, continuous visual checking of the tailings diverts the attention of the operator from steering and operation of the combine.

U.S. Pat. No. 3,515,144 to Morrison discloses a tailings monitor having a pivoted sensing element at the discharge end of the tailings elevator which is deflected in response to the weight of tailings delivered by the elevator and an electrical circuit associated with the sensing element which closes a switch to light an indicator lamp when the quantity of tailings exceeds a predetermined amount. However, the response of such monitor having a deflectable weight-responsive sensing element is affected by both the density of the tailings and the velocity at which such tailings are discharged from the tailings return conveyor with the result that the monitor will not always accurately indicate the volume of tailings which are not granular but rather have stalks, leaves and heads of mature crops and are "fluffy." Further, such deflectable-element tailings sensing means is difficult to calibrate.

OBJECTS OF THE INVENTION

It is an object of the invention to provide an improved tailings monitor which provides a more accurate indication of the volume of tailings than prior art monitors. Another object is to provide such an improved tailings monitor whose indication is independent of the density of the tailings and the velocity at which they are discharged from the tailings return conveyor.

BRIEF DESCRIPTION OF THE DRAWINGS

These and other objects and advantages of the invention will be more readily apparent from the following detailed description when considered together with the accompanying drawing wherein:

FIG. 2 is a partial horizontal section view of the combine taken along line II—II of FIG. 1;

FIG. 3 is a partial side view of the combine shown in FIG. 1 with parts broken away to show the connection of the tailings elevator with a distribution auger and the cleaning stage;

FIG. 4 is a section view taken along line IV—IV of FIG. 3; and

SUMMARY OF THE INVENTION

A combine harvester vehicle having crop cutting means and threshing, separating and cleaning stages including a tailings portion operative to separate incompletely threshed and separated tailings from the grain and a tailings return elevator for conveying the tailings from the tailings portion to one of the stages for recycling, is provided in accordance with the invention with a tailings monitor having means for transmitting a radiant energy beam internally of the elevator transversely across the path of tailings being conveyed in the elevator and detector means in the path of the radiant energy beam for providing to the combine operator a visual indication proportional to the percentage of time that the beam is interrupted by the tailings being conveyed in the elevator as a measure of tailings volume.

In a preferred embodiment the detector means includes a photodetector diode upon which the radiant energy beam impinges, a transistor, and means coupled to the photodetector diode and to the base of the transistor for developing digital signals at the collector of the transistor indicative of whether the beam is impinging on the photodetector diode or is being interrupted by the tailings conveyed in the elevator. An RC circuit includes a capacitor which is charged through a resistance from the "high" output of an inverter op-amp stage when the radiant energy beam is interrupted and a logical zero signal is present on the collector of the transistor, and the inverter op-amp is switched to a "low" output when the beam impinges on the photodetector diode and transistor conducts to generate a logical one signal on its collector, thereby developing an average voltage across the capacitor proportional to the percentage of time that the radiant beam is interrupted by the tailings being conveyed in the return elevator. The average voltage developed across the capacitor is applied to a potential indicating meter to visually display the volume of tailings to the combine operator. In an alternative embodiment the digital signals are applied to a microprocessor for processing of the signals and display to the combine operator.

DETAILED DESCRIPTION OF A PREFERRED EMBODIMENT

Figure 1:
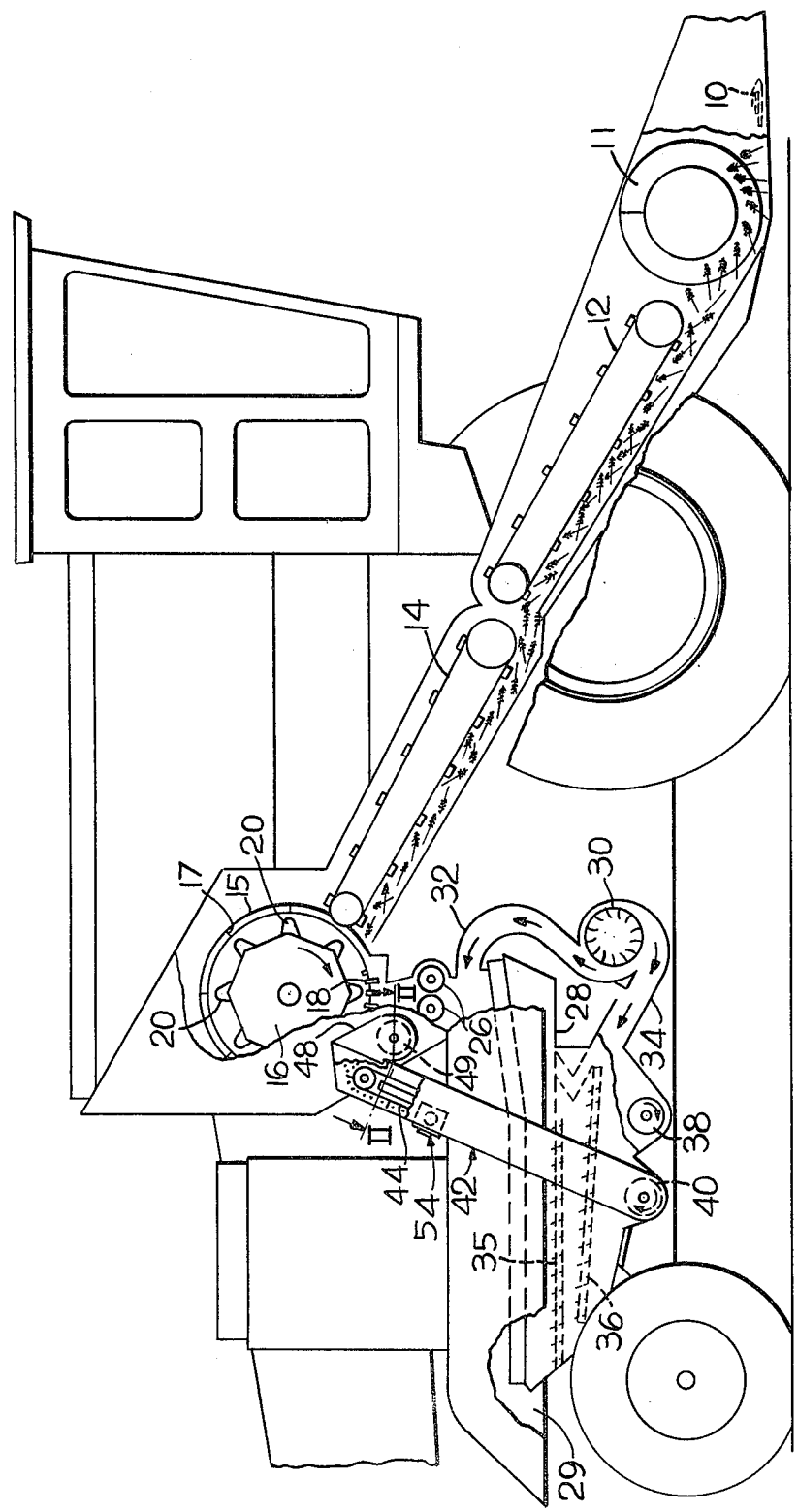
FIG. 1 is a side view of a combine harvester vehicle in which the present invention is incorporated with parts broken away for illustration purposes.

Referring to FIG. 1 of the drawing, a known combine harvester may have a cutter bar 10 which cuts the standing crop and an auger 11 which moves the cut crop inwardly to where a first slat feeder 12 advances the cut crop upwardly and rearwardly to a second slat feeder 14. The second slat feeder 14 moves the cut crop to an opening in a cylindrical threshing cage 15 in which a threshing cylinder 16 is rotatably mounted. Cage 15 is essentially a cylindrical screen having helical internal bars, or ribs 17 and a concave 18, and second slat feeder 14 feeds the cut crop tangentially between the concave 18 and the rotating threshing cylinder 16 which has thresher bars 20 that beat the crop against the concave 18 to initially separate the grain from the straw in the threshing stage of the combine harvester. The straw which stays within cage 15 is moved axially in a spiral path by the helical ribs 17 on the inside of the cage to a discharge impeller (not shown) adjacent a discharge opening (not shown) at the rear side of one axial end of cage 15 which discharges the straw rearwardly from the cage. As this action takes place, grain is separated from the straw by centrifugal force in the separating stage of the combine harvester.

Threshed material passing through the peripheral openings in cage 15 or downwardly through concave 18 is guided by distribution augers (not shown) and falls downwardly between toothed accelerator rolls 26 which accelerate a mixture of grain, chaff and stalk particles downwardly toward a grain pan 28. As they fall toward grain pan 28, the chaff and other light materials are blown rearwardly and out a rear discharge opening 29 by a stream of pressurized air from a fan 30 directed by an upper duct 32. Fan 30 also supplies cleaning air for the shoe assembly by way of a lower duct 34. The grain or seed passes downwardly to grain pan 28 and thence rearwardly to the upper and lower sieves 35, 36 of the longitudinally reciprocating shoe assembly in the cleaning stage of the combine harvester. The clean grain or seed separated from the chaff by the shoe assembly passes to a clean grain auger 38 from where it is elevated by means not shown to a storage bin. The tailings which do not pass through sieves 35, 36 and which are not blown out rear discharge opening 29 by the air supplied by fan 30 through ducts 32 and 34 slide down to a tailings auger 40 in a tailing portion of the cleaning stage of the harvester.

The lower end of a tailings return elevator 42 is connected in tailings-receiving relation to the discharge end of the tailings auger 40. Tailings return elevator 42 includes an endless chain 44 on which transverse paddles 45 are mounted. The tailings, which are not granular but rather include leaves, stalks, heads of mature vegetation and hulls or pods containing kernels of grain or seed, are conveyed to the top of tailings elevator 42 by paddles 45 and discharged at the upper end thereof through a transfer case 48 to the outboard end of a distribution auger 49. The tailings are relatively fluffed and may be considered to float along elevator 42 in "non-bed" fashion as they are accelerated by paddles 45.

The outboard end of distribution auger 49 extends laterially outward into transfer case 48 which includes a lower cylindrical part 51 coaxial with auger 49. Distribution auger 49, in turn, conveys the tailings to a feeder slot 53 (see FIG. 2). The tailings pass through feeder slot 53 and fall onto accelerator rolls 26 which accelerate them downward through the airstream from upper duct 32 onto grain pan 28. By this procedure a substantial quantity of the seed contained in the tailings is separated from the hulls or pods without coming into contact with threshing cylinder 16, whereby cracking of the seeds is avoided. It will be appreciated that a tailings return elevator could, if desired, alternatively, recycle the tailings to the threshing stage for rethreshing or to the separating stage.

A tailings monitor 54 installed in tailings return elevator 42 continuously senses and displays to the combine operator the percent volume of tailings being conveyed in elevator 42 as an indication of the efficiency of the harvesting process. More specifically, the percent volume of tailings displayed by monitor 54 to the operator is an indication of the efficiency of threshing cylinder 16 and the cleaning shoe 35, 36.

Figure 5:
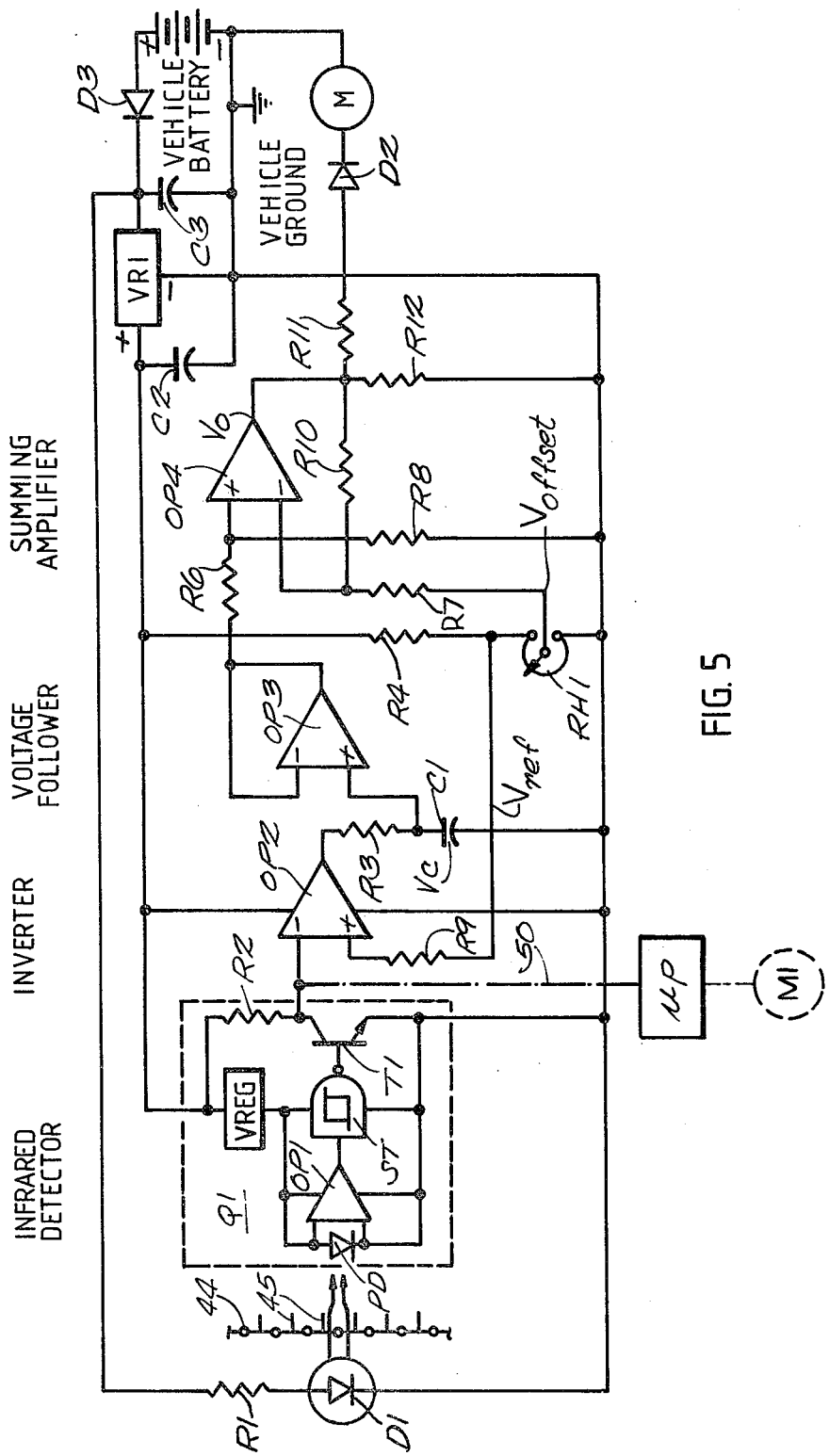
FIG. 5 is an electrical circuit diagram of a preferred embodiment of tailings monitor.

Tailings elevator 42 is rectangular in cross section and has sidewalls 56 and front and rear walls 58. Monitor 54 includes optical sensing means having a photodiode D1 mounted in a sidewall 56 so as to transmit a radiant energy beam I shown in dashed lines across the interior of elevator 42 transverse to the path of paddles 45 and the tailings being accelerated thereby and also includes a photoelectric diode PD mounted in rear 58 upon which beam I impinges. Photodiode D1 may be any photon emitting device such as an LED but it is shown in FIG. 5 as an infrared radiating diode connected in series with a resistor R1 and a diode D3 across the positive terminal + and ground of the combine vehicle battery. A voltage regulator VR1 may be energized from the positive and ground terminals of the vehicle battery. Photodetector diode D1 may be an element of a commercially available infrared detector Q1 of the SD5600 type commercially available from Spectronics Corp., a division of Honeywell, Inc., and the voltage across the output terminals + and − of regulator VR1 may be impressed across Q1. The output of photoelectric diode PD is amplified by an op-amp OP1 and then applied to a Schmitt trigger circuit ST which has fixed triggering levels and removes noise and transients from the signal. The output of ST is applied to the base of an NPN transistor T1 of the Q1 detector unit. The collector-emitter circuit of T1 is connected in series with a resistor R2 across the + and − output terminals of voltage regulator VR1 so that T1 conducts to generate a logical zero signal on its collector when infrared beam I emitted by D1 is interrupted by a paddle 45 or by tailings moving through elevator 42 and is turned off to generate a logical one signal on its collector when beam I impinges on photodetector diode PD.

The percent time that transistor T1 conducts is an inverted measure of the percentage interruption of beam I by the tailings which, as discussed hereinbefore, are not granular but rather include stalks, leaves, heads of mature vegetation and hulls or pods containing kernels of grain or seed so such tailings are somewhat fluffy and rather float up elevator 42 as they are accelerated by paddles 45. The percent time that T1 conducts is thus a representative measure of tailings volume.

A capacitor C1 is charged and discharged through a resistance R3 and an op-amp OP2 of an inverter stage. A positive reference voltage $V_{ref}$ derived from a voltage divider comprising a resistance R4 connected in series with a rheostat RH1 across the output terminals of voltage regulator VR1 is applied through a decoupling resistor R9 to the + input of op-amp OP2. The collector of T1 is coupled to the − input of OP2, and $V_{ref}$ maintains the output of op-amp OP2 high to charge capacitor C1 through R3 while beam I is interrupted so T1 is conducting and its collector is grounded. Decoupling resistance R9 minimizes the effects of currents flowing from the inverter stage on the $V_{ref}$ point.

When infrared beam I is not being interrupted by tailings in elevator 42, transistor T1 is turned off and a logical one voltage higher than $V_{ref}$ is applied to the − input of OP2 derived from the series arrangement of a resistance R2 and the collector-emitter circuit of T1 connected across the output terminals of regulator VR1, thereby switching the output of OP2 low and discharging capacitor C1. When beam I is interrupted by tailings being conveyed through elevator 42, transistor T1 conducts and connects the − input of OP2 to ground, thereby switching the output of OP2 high to charge capacitor C1. As a consequence, an average voltage $V_e$ is developed across capacitor C1 whose magnitude is now directly proportional to the percentage of time that beam I is interrupted by tailings being conveyed in elevator 42.

Voltage $V_c$ across capacitor C1 is transmitted by a buffer, or voltage-follower op-amp OP3 through a resistance R6 to the positive input of summing op-amp OP4. An offset voltage $V_{offset}$ derived from the slider of rheostat RH1 is applied through a resistance R7 to the − input of summing op-amp OP4 and permits the operator to zero tailings monitor 54 by subtracting out the effect of paddles 45 when tailings elevator 42 is operated empty of tailings.

$V_{offset}$ and $V_c$ are coupled respectively to the − and + input terminals of summing op-amp OP4 whose output signal $V_o = V_c$ minus $V_{offset}$. The $V_o$ output from summing op-amp OP4 drives a cab-mounted meter M (typically a 0–5 milliampere ammeter) through a resistance R11 and a reverse polarity diode D2 so that meter M displays to the combine operator the percent volume of tailings being conveyed through elevator 42.

In an alternative embodiment the collector or T1 is connected by a conductor 50 represented in dot-dash lines to a microprocessor µp for digital processing of the digital signals generated on the collector of T1 and display of tailings volume to the combine operator on a meter M1. Conductor 50 is grounded when tailings interrupt beam I and T1 is turned on to generate a logical zero signal on its collector, and conductor 50 is connected to logical one voltage when beam I impinges on photodetector diode PD and T1 is turned off, whereby µp receives rectangular pulses representative of the percent time that beam I is interrupted by the tailings moving through elevator 42.

The embodiments of the invention in which an exclusive property or privilege is claimed are defined as follows:

1. In a combine harvester vehicle having crop cutting means and threshing and separating stages operative to separate the grain from the other crop material and a cleaning stage operative to substantially remove chaff and the like from the grain received from the threshing and separating stages and including a tailings portion operative to separate incompletely threshed and separated tailings from the grain, said harvester vehicle also having a tailings return elevator for conveying said tailings from said tailings portion to one of said stages for recycling, the improvement comprising means for transmitting a radiant energy beam internally of said elevator transversely across the path of said tailings being conveyed in said elevator, and means for providing a visual indication proportional to the percentage of time that said beam is interrupted by said tailings being conveyed in said elevator, said last mentioned means including a detector in the path of said beam.

2. In a combine harvester in accordance with claim 1 wherein said means for providing a visual indication includes an RC charging circuit having a capacitor in series with a timing resistance and means for charging said capacitor through said timing resistance when said tailings being conducted through said elevator interrupt said beam and for discharging said capacitor through said timing resistance when said beam impinges upon said detector, said last-named means being coupled to said detector whereby an average voltage is developed across said capacitor which is an analog representation of tailings being conveyed in said elevator.

3. In a combine harvester in accordance with claim 1 wherein said detector includes a photodetector diode upon which said beam impinges, a transistor having a collector, and means for controlling the conductive state of said transistor in accordance with whether said beam impinges upon said photodetector diode or said beam is interrupted by said tailings, said last-named means being coupled to said photodetector diode and said means for providing a visual indication includes a microprocessor coupled to the collector of said transistor.

4. In a combine harvester in accordance with claim 2 wherein said detector includes a photodetector diode upon which said beam impinges, a transistor having a collector, and means for controlling the conductive state of said transistor as a function of whether said beam impinges upon said photodetector diode or is interrupted by said tailings, said last-named means being coupled to said photodetector diode and to the base of said transistor and said means for charging and for discharging said capacitor is coupled to the collector of said transistor.

5. In a combine harvester in accordance with claim 4 and further comprising a DC power supply having a cathode, wherein said transistor has an emitter-collector circuit connected in series with a timing resistance across said DC power supply so that said emitter is connected to the cathode of said DC power supply, and said means for charging and for discharging said capacitor includes an operational amplifier having its output applied through said timing resistance to said capacitor and its negative input coupled to the collector of said transistor and said charging and discharging means also includes means for applying a positive reference voltage to the positive input of said operational amplifier, whereby the output of said operational amplifier is high to charge said capacitor when said transistor is turned off and is switched low to discharge said capacitor when said transistor conducts.

6. In a combine harvester in accordance with claim 4 or 5 wherein said means for providing a visual indication includes an electrical meter visible to the combine operator and means for applying the voltage across said capacitor to said meter.

7. In a combine harvester in accordance with claim 2 or 5 wherein said tailings return elevator includes an endless conveyor having transversely extending paddles for moving said tailings through said elevator, said means for providing a visual indication includes a potential difference indicating meter and a summing operational amplifier having the voltage across said capacitor applied to one input and its output applied to said potential difference indicating meter, and said means for providing a visual indication also includes voltage divider means for applying an offset voltage to the other input of said summing operational amplifier to compensate for the interruption of said beam by said paddles and zero said meter.

8. In a combine harvester vehicle having crop cutting means and threshing and separating stages operative to separate the grain from the other crop material and a cleaning stage operative to remove chaff and the like from the grain received from the threshing and separating stages, said cleaning stage having a tailings portion operative to separate incompletely threshed and separated tailings from the grain, said harvester vehicle also having a hollow tailings return elevator for conveying said tailings from said tailings portion to one of said stages for recycling, the improvement comprising means for transmitting a radiant energy beam internally of said elevator transversely across the path of said tailings being conveyed in said elevator, detector means for deriving digital signals indicative of whether said beam is impinging on said diode or is being interrupted by said tailings being conveyed in said elevator, said detector means including a photoelectric diode in the path of said beam, an RC circuit including a resistance in series with a capacitor for charging said capacitor through said resistance when said digital signal is present indicating that said beam is interrupted and for discharging said capacitor through said resistance when the opposite digital signal is present to thereby develop a voltage across said capacitor whose average value is an analog of the percentage of time that said beam is interrupted by said tailings, and means for providing a visual indication which is a function of said voltage developed across said capacitor as a measure of the volume of tailings, said last-named means including a voltmeter.

9. In a combine harvester vehicle having crop cutting means and threshing and separating stages operative to separate the grain from the other crop material and a cleaning stage operative to remove chaff and the like from the grain received from the threshing and separating stages and including a tailings portion operative to separate incompletely threshed and separated tailings from the grain, said harvester vehicle also having a hollow tailings return elevator for conveying said tailings from said tailings portion to one of said stages for recycling of said tailings, the improvement comprising means for transmitting a radiant energy beam internally of said elevator transversely across the path of said tailings being conveyed in said elevator, detector means for deriving digital signals indicative of whether said beam is impinging on said diode or is being interrupted by tailings being conveyed in said elevator, said detector means including a photoelectric diode in the path of said beam, and means for providing a visual indication of the percentage of time that said beam is interrupted by said tailings, said last-named means including a microprocessor receiving said digital signals as an input.

* * * * *